Jan. 26, 1943. H. G. ROBINSON 2,309,358
WORK GUIDE
Filed May 28, 1941
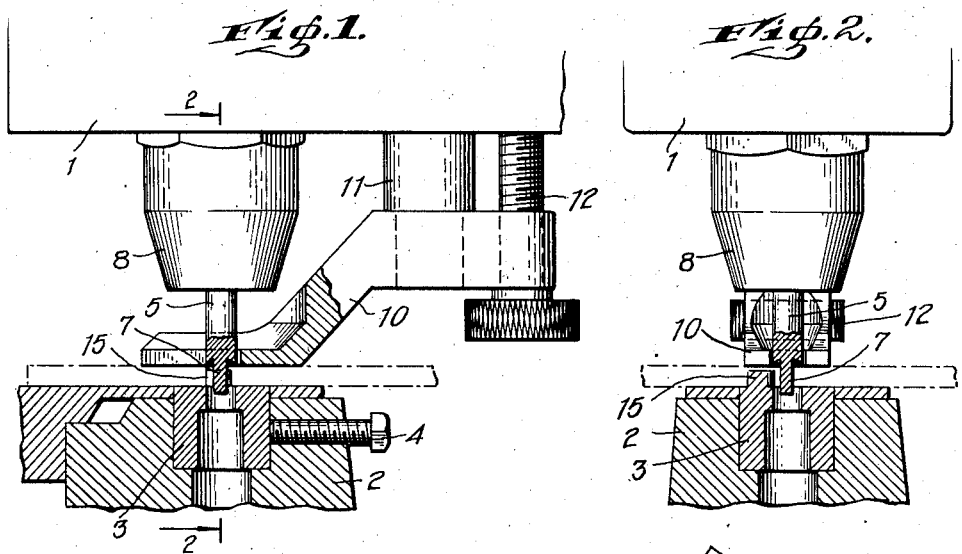
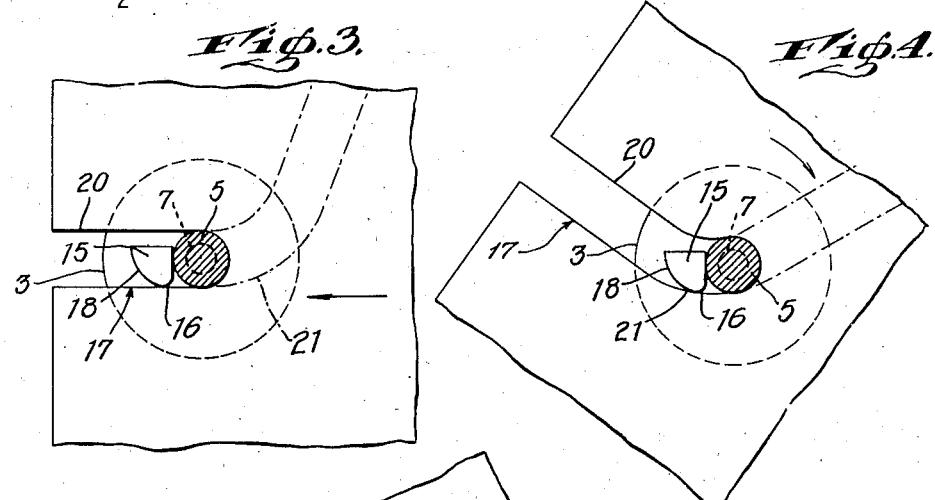
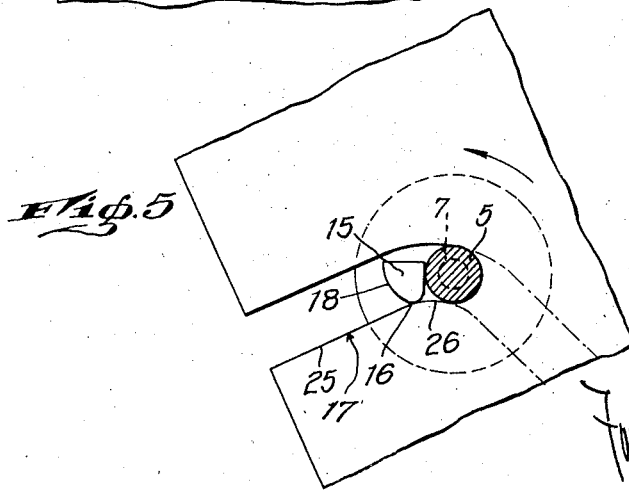
INVENTOR
HARRY G. ROBINSON
BY
Frederick S. Duleau
ATTORNEY Patented Jan. 26, 1943

2,309,358

UNITED STATES PATENT OFFICE 2,309,358

WORK GUIDE

Harry G. Robinson, Stratford, Conn., assignor to American Chain & Cable Company, Inc., New York, N. Y., a corporation of New York Application May 28, 1941, Serial No. 395,550

6 Claims. (Cl. 164—47)

This invention relates to improvements in a work guide for punching machines more particularly of the type known as "nibblers" herein shown as a machine of the type disclosed in the patent to Campbell 1,646,851 October 25, 1927.

Among the objects of this invention is the provision of guiding means for guiding the work as it is being fed through a punching machine, as for example, in cutting the work to a scribed line, for preventing "jumping-in" and spoiling of the part of the work being cut and for cutting the work without the use of a straight edge or templet.

Another object of the invention is the provision of a work guide on the fixed die of a punching machine of such construction as to facilitate cutting sharp corners or curves of small radius of curvature in either direction and to be long lasting.

Other objects of the invention will appear from the following description taken in connection with the drawing, in which—

Fig. 1 is a right side elevational view, partly in section, of the female die and the punch and punch operating means;

Fig. 2 is a front elevational view partly in section on the line 2—2 of Fig. 1;

Fig. 3 is a horizontal section through the punch indicating a left-hand curved slot to be cut;

Fig. 4 is a similar view showing the work being rotated clockwise in cutting a left-hand curved slot; and Fig. 5 is a similar view showing the work being turned counterclockwise in cutting a right-hand curved slot.

Reference has been made to the patent to Campbell to disclose a punching machine to which my improvements have been shown applied. By reference to said patent it will be seen that the machine includes a frame member herein designated 1 upon which is supported an anvil or work support 2 in which is seated the female die 3 secured in place by a set screw 4. The punch 5 is provided with a pilot 7 which guides the work and limits its feed as the operation of nibbling or punching proceeds. The punch is supported in a punch carrier 8 which reciprocates in a vertical bore in the frame of the machine and is operated by a suitable power device, such as a motor. The machine also includes a foot or guide 10 mounted on a sliding post 11 adjusted by a screw 12.

The female die 3 in accordance with my invention is provided with a work guide 15 which preferably is of segmental shape, preferably a 90° segment as shown, the longest dimension of which is shorter than the diameter of the punch in order that the work may be turned freely on the guide. The forward corner of the rounded surface of the guide as indicated at 16 is preferably rounded for the purpose of providing a larger bearing surface for the forward edge 17 of the slot when cutting right-hand curved slots as shown in Fig. 5. The arcuate surface 18 of the segmental guide provides a long bearing surface for the forward edge 17 of the slot when cutting left-hand curved slots as shown in Figs. 3 and 4.

In operating the machine the operator stands in front of the machine and feeds the work toward his left as indicated by the large arrow, with his right-hand and presses the forward edge 17 of the slot aganst the guide 15 with his left hand. In cutting a left hand curved slot as shown in Figs. 3 and 4 the work is placed on the right hand side of the machine and is then moved toward the left in a straight line with the forward edge 17 of the slot pressed against the guide to produce the straight portion 20 of the slot Fig. 3 and then in cutting the curved portion 21 of the slot the work is rotated clockwise as indicated by the curved arrow in Fig. 4 with the forward edge 17 of the slot pressed against the curved surface 18 of the guide 15. In cutting the right-hand curved slot shown in Fig. 5 the straight part 25 of the slot is cut by moving the work toward the left, the same as in the case of Fig. 3 and the curved portion 26 of the slot is then produced by rotating the work counterclockwise as indicated by the small curved arrow with the forward edge 17 of the slot pressed against the rounded corner 16 of the guide 15. The work may be cut free hand or if desired it may be cut along a scribed line depending upon the skill of the cutter and the accuracy of cut required.

The guide might be of different cross sectional shapes. For example, it might be of circular cross section. I prefer to employ a guide of the cross sectional shape disclosed, as I have found that this particular shape provides a guide which will last longer in service. The largest cross sectional dimension of the guide should be less than the diameter of the punch in order that sharp curves may be cut. By using a guide of segmental shape I can provide a longer arcuate wearing surface on a larger radius than if the guide were of circular cross section so as to present a larger wearing surface for the forward edge of the slot which is pressed against the guide. As viewed in the figures the forward edge 17 of the slot bears against the arcuate surface 18 of the guide shifting toward the left on said surface as the left-hand curved slot is cut, thus distributing the wear over the long arcuate part of the surface of the guide. In cutting a left-hand curved slot as shown in Figs. 3 and 4, the work is moved toward the left and also rotated clockwise by the right hand which rotation has a tendency to move the forward edge of the slot away from the guide, thus necessitating the application of a substantial pressure by means of the left-hand to keep the forward edge of the slot in contact with the guide. This causes a greater amount of wear than when cutting a right-hand curved slot shown in Fig. 5 in the cutting of which the work is moved to the left and rotated counterclockwise by the right-hand which incidentally presses the forward edge of the slot against the rounded corner 16 of the guide requiring a much smaller pressure to be exerted by the left-hand to hold the forward edge of the slot against the guide and therefore there is less wear on the guide in cutting right-hand slots than cutting left-hand slots. While guides of circular cross section have been used in the course of experiments, it has been found that these wear away rather rapidly and that a guide of the particular form disclosed appears to be the preferred form for long life of the guide. It will also be noted that by using a guide of the cross sectional shape disclosed that the point of engagement between the guide and the forward edge of the slot as viewed in these figures is generally closer to the cutting edge of the punch which makes it easier to cut a slot by following a scribed line or templet as is obvious.

While I have shown and described my invention with particularity, it is to be understood that I reserve the right to all such changes as fall within the principles of my invention and the scope of the appended claims.

I claim:

1. In a punching machine, the combination with a reciprocating punch and a cooperating female die, of a work guide formed integral with said die with its front side in alinement with the rear side of the hole in the die and having shorter dimensions at right angles to and in the line of the direction in which the work is fed in cutting straight slots than the width of the punch.

2. In a punching machine, the combination with a reciprocating punch and a cooperating female die, of a work guide located adjacent the rear side of the hole in the die and having its rear face located at a shorter distance from the rear side of the hole in the die than the width of the punch.

3. In a punching machine, the combination with a reciprocating punch and a cooperating female die, of a work guide of less height than the thickness of the work to be cut and formed integral with said die with its front side in alinement with the rear side of the hole in the die and having shorter dimensions at right angles to and in the line of the direction in which the work is fed in cutting straight slots than the width of the punch.

4. In a punching machine, the combination with a reciprocating punch and a cooperating female die, of a work guide of less height than the thickness of the work to be cut and located adjacent the rear side of the hole in the die and having its rear face located at a shorter distance from the rear side of the hole in the die than the width of the punch.

5. In a punching machine, the combination with a reciprocating punch and a cooperating female die, of a work guide on said die of segmental shape of a radius of less length than the width of the punch with one of its straight sides extending tangentially with respect to the hole in the die and its arcuate side facing the operator for guiding contact by the forward edge of a slot cut in the work.

6. In a punching machine, the combination with a reciprocating punch and a cooperating female die, of a work guide on said die of segmental shape and of a radius of less length than the width of the punch, and having one of its straight sides arranged tangentially with respect to the hole in the die and its other straight side arranged at right angles to said first straight side and having the corner between the first straight side and the arcuate side rounded for engagement by one edge of the slot cut in the work as the other edge of the slot is moved parallel to said second mentioned straight side.

HARRY G. ROBINSON.